United States Patent Office 3,306,917
Patented Feb. 28, 1967

3,306,917
PROCESS FOR PREPARING GROUP VIII METAL CYCLOPENTADIENYL COMPOUNDS
Hymin Shapiro, Earl G. De Witt, and Jerome E. Brown, Baton Rouge, La., assignors to Ethyl Corporation, New York, N.Y., a corporation of Virginia
No Drawing. Filed Aug. 2, 1965, Ser. No. 476,698
5 Claims. (Cl. 260—429)

This application is a continuation-in-part of application Serial No. 417,919, filed March 22, 1954, now abandoned, and a continuation-in-part of application Serial No. 297,392, filed July 5, 1952.

This invention relates to a process for the preparation of organo metallic compounds. In particular, this invention relates to the preparation of cyclopentadienyl moiety-containing compounds of the Group VIII elements of the Periodic Table.

A method employed for preparing a Group VIII metallic cyclopentadienyl moiety-containing compound, namely dicyclopentadienyl iron, is the interaction of a cyclopentadienyl Grignard reagent with ferric chloride. This kind of process involves a number of steps requiring extremely close control and is, therefore, quite costly. One serious shortcoming of this method is the low yield in which the products are obtained. Another method used heretofore for the preparation of this iron compound is the reaction between reduced iron in the presence of alumina and potassium oxide, and preferably also molybdenum oxide, with cyclopentadiene in nitrogen at 300° C. However, in this process it is extremely difficult to keep the iron in a reactive state making such a process cumbersome and expensive. It can be seen, therefore, that a need exists for a process of preparing cyclopentadienyl moiety-containing compounds of the Group VIII elements of the Periodic Table in high yields without involving difficult methods. By "cyclopentadienyl moiety-containing" we mean compounds containing the cyclopentadiene group or configuration within the hydrocarbon portion of the molecule.

It is, therefore, an object of the present invention to provide a novel process for preparing metallic cyclopentadienyl moiety-containing compounds of the Group VIII elements of the Periodic Table. It is a further object of this invention to provide a process for the preparation of metallic cyclopentadienyl compounds of Group VIII elements whereby such compounds can be obtained with relative ease and in high yield. Additional important objects of our invention will become apparent from the discussion which hereinafter follows:

In accordance with the instant invention the above and other objects can be accomplished by providing a process for the manufacture of Group VIII metallic cyclopentadienyl moiety-containing compounds comprising reacting a cyclopentadienyl alkali metal compound with a salt, preferably a halide salt of a metal of Group VIII. In other words, we have found that we can react a cyclopentadienyl-type alkali metal compound with an anhydrous halide of a Group VIII element to produce cyclopentadienyl-type compounds of the Group VIII elements, as for example, the process of preparing dicyclopentadienyliron which comprises reacting an anhydrous iron halide with cyclopentadienyl sodium, and also, the process of preparing the dicyclopentadienyl cobalt bromide which comprises reacting an anhydrous cobaltic bromide with cyclopentadienyl potassium. Reaction proceeds readily and the products are easily recovered in high yield and purity because of the stability of the metallic cyclopentadienyl compounds. For example, when using our process, dicyclopentadienyliron can be obtained in yields of 92 percent or higher as compared to a low of 16 percent obtained on reacting ferric chloride with cyclopentadienyl magnesium halides.

Cyclopentadienyl moiety-containing hydrocarbons that can be used in forming the cyclopentadienyl moiety-containing alkali metal compounds used in the process of this invention can be represented by the formula

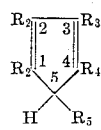

where $R_1$, $R_2$, $R_3$, $R_4$ and $R_5$ can be the same or different and can be hydrogen or a hydrocarbon group containing from one to about twenty carbon atoms, wherein said hydrocarbon group can be aliphatic, aromatic and/or cycloaliphatic substituted aliphatic, alicyclic, aromatic and/or aliphatic substituted alicyclic, aromatic, aliphatic and/or alicyclic substituted aromatic, and wherein the aliphatic portions of the group can be straight or branched chain and can have one or more units of unsaturation therein. Examples of such compounds are cyclopentadiene, 1-methyl cyclopentadiene, 1-ethenyl cyclopentadiene and the like. Also, the $R_1$ and $R_2$ groups as well as the $R_3$ and $R_4$ groups can be linked together by a carbon-to-carbon bridge as in indene and 1,2,3,4-tetrahydrofluorene for example, where six-membered rings are fused onto the five-membered cyclopentadiene ring. Other examples of these compounds are given hereinbelow. Cyclopentadienyl alkali metal compounds result when the hydrogen shown in the above formula, that is, the hydrogen in the 5 position, is substituted by an alkali metal. Illustrative examples are cyclopentadienyl sodium, 1-methyl cyclopentadienyl sodium, cyclopentadienyl lithium, indenyl lithium, fluorenyl sodium, and the like.

Non-limiting examples of products obtained by the process of this invention are: bis(1-methyl cyclopentadienyl)iron which can be obtained by the reaction of 1-methyl cyclopentadienyl sodium with anhydrous ferric chloride, dicyclopentadienyl nickel which can be obtained by the reaction of cyclopentadienyl lithium with anhydrous nickel chloride, dicyclopentadienyl ruthenium which can be obtained by the reaction of cyclopentadienyl sodium with ruthenium chloride, dicyclopentadienyl-cobalt chloride which can be obtained by the reaction of cyclopentadienyl-potassium with cobaltic chloride, and the like. A more extensive list of products is given hereinbelow.

The general method for preparing the metallic cyclopentadienyl moiety-containing compounds comprises the interaction of a cyclopentadienyl alkali metal compound with a salt of the desired metal. An example of this is the interaction of a cyclopentadienyl alkali metal compound with an anhydrous halide of a Group VIII element of the Periodic Table. Illustrative of this is the process of preparing dicyclopentadienyliron which comprises reacting an anhydrous iron halide with cyclopentadienyl sodium. The anhydrous halide in this case can be anhydrous ferric chloride. In carrying out this process the cyclopentadienyl alkali metal compound is usually added to the halide of a Group VIII element although the order of addition can be reversed. It is preferred to have the halide of the Group VIII element dissolved in a suitable solvent, illustrative of which are diethyl ether, benzene, toluene, and the like. The solvent serves the purpose of facilitating uniform contact between the two reagents and for moderating the reaction rate.

The invention will be more fully understood by reference to the following set of illustrative examples wherein all parts and percentages are by weight.

*Example I*

*Di(cyclopentadienyl)iron.*—A stirred reaction vessel provided with a reflux condenser and means for introducing liquid components was charged with 300 parts of anhydrous ethyl ether and 40 parts of magnesium metal. To this mixture was added 205 parts of ethyl bromide, the addition taking a period of approximately one hour, followed by the addition of 178 parts of cyclopentadiene. A solution of 90 parts of anhydrous ferric chloride in 200 parts of diethyl ether was then added to the reaction mixture over a period of approximately 30 minutes. The reaction mixture was then maintained at a reflux temperature in the order of 40° C. for a period of one hour. After cooling, the crude di(cyclopentadienyl)iron was isolated by adding an approximately 10 percent aqueous solution of ammonium chloride to the reaction mixture. The ether layer containing the desired product was separated and the ether removed by distillation. Forty-eight parts of crude product were obtained. The 48 parts of the crude product so obtained was recrystallized from ethyl alcohol solution and dried, yielding 26 parts of pure di(cyclopentadienyl)iron, amounting to an overall recovery of 25 percent. By analysis, this material was shown to contain 29.43 percent iron, while the formula $C_{10}H_{10}Fe$ requires 30.02 percent iron.

The above is an example of a prior art method of preparing di(cyclopentadienyl)iron. The example which follows illustrates the preparation of di(cyclopentadienyl)iron by the process of this invention and it will be noted that the yield of product in this case is about four times as great as that obtained by the prior art method.

*Example II*

*Cyclopentadienyl lithium.*—Cyclopentadienyl lithium was obtained by preparing n-butyl lithium and reacting this compound with cyclopentadiene. According to this process, 68.5 parts of n-butyl bromide were added to 8.6 parts of lithium metal in anhydrous diethyl ether at a temperature of −10° C. The resultant ether solution of n-butyl lithium was filtered and then added to 20.4 parts of cyclopentadiene dissolved in 70 parts of diethyl ether. The product, cyclopentadienyl lithium, settled out as a white solid, the completion of the reaction being evidenced by the cessation of butane evolution. The procedure followed in the above synthesis was that described in Organic Reactions, volume VI, pp. 352–353, John Wiley and Sons, Inc., New York (1951).

*Dicyclopentadienyliron.*—The cyclopentadienyl lithium in ether, prepared as above, was slowly added with agitation to 21 parts of anhydrous ferric chloride which was completely dissolved in 91 parts of anhydrous diethyl ether and contained in a vessel equipped with means for refluxing liquids, means for controlling temperature, and temperature measuring devices. The reaction was vigorous and exothermic and was evidenced by a transient green color which rapidly changed to orange-yellow. On completion of the addition of the cyclopentadienyl lithium, 500 parts of a saturated solution of aqueous ammonium chloride was added to the reaction mixture accompanied by vigorous agitation. Three hundred parts of benzene were then added to the mixture to aid in the solvation of the cyclopentadienyliron. The ether-benzene layer was next separated from the aqueous layer and the ether and benzene removed under vacuum. The residue was recrystallized from 560 parts of hot ethanol and yielded 22.3 parts of dicyclopentadienyliron in the form of orange crystals (92 percent yield based on the amount of ferric chloride used), melting at 170–173° C.

Equally high yields of products are obtained when the teachings of the above example is employed in reacting other cyclopentadienyl alkali metal compounds with ferric halides as for example, the reaction between 1-methyl cyclopentadienyl sodium with ferric chloride in diethyl ether to produce bis(1-methyl cyclopentadienyl)iron, the reaction between 2,3-dimethyl cyclopentadienyl lithium with ferric bromide in anhydrous benzene to produce bis(2,3-dimethyl cyclopentadienyl)iron, the reaction between indenyl sodium with ferric chloride in a solvent composed of a mixture of diethyl ether, benzene, and hexane to produce diindenyl iron, and the like.

*Example III*

*Cyclopentadienyl sodium.*—Cyclopentadienyl sodium is obtained by preparing n-butyl sodium and reacting this compound with cyclopentadiene. According to this process, 69 parts of n-butyl bromide is added to 28.6 parts of sodium metal in anhydrous diethyl ether at a temperature of −10° C. The resultant ether solution of n-butyl sodium is filtered and then added to 21 parts of cyclopentadiene dissolved in 75 parts of diethyl ether. The completion of the reaction, in which the cyclopentadienyl sodium is produced, is evidenced by the cessation of the butane evolution. The procedure followed in the above synthesis is that described in Organic Reactions, volume VI, pp. 352–353, John Wiley and Sons, Inc., New York (1951).

*Di(cyclopentadienyl)iron.*—To a vessel equipped with openings for charging and discharging liquids and solids, means for refluxing liquids, temperature measuring devices, means for regulating temperature, and fitted with a mechanical agitator, there are added 20.5 parts of anhydrous ferric chloride completely dissolved in 95 parts of anhydrous diethyl ether. To this ferric chloride-ether solution is added the cyclopentadienyl sodium in ether, prepared as above, in small amounts while maintaining agitation. A vigorous reaction occurs resulting in the formation of a transient green color which rapidly changes to orange-yellow. On completion of the addition of the cyclopentadienyl sodium, 400 parts of a saturated solution of aqueous ammonium chloride are added to the reaction mixture accompanied by vigorous agitation. The product is isolated from this mixture by extraction with 350 parts of benzene which is added to the mixture with thorough agitation. The ether-benzene layer is then separated from the aqueous layer and the ether and benzene removed by vacuum distillation. The residue is recrystallized from 555 parts of hot ethanol to produce an almost quantitative yield of dicyclopentadienyliron in the form of orange crystals, melting at 170–173° C.

*Example IV*

*Bis(1 - methyl cyclopentadienyl)nickel.* — The cyclomatic alkali compound, 1-methyl cyclopentadienyl sodium in this case, is prepared in a manner similar to that described in Example III. Forty parts of this compound are slowly added with agitation to 15.5 parts of nickel chloride in 90 parts of anhydrous toluene. The reaction temperature is kept below or at the boiling point of toluene by means of refluxing in an apparatus similar to that described in Example III. At the completion of the reaction the excess 1-methyl cyclopentadienyl sodium is decomposed by the addition of 450 parts of a saturated solution of aqueous ammonium chloride to the reaction mixture accompanied by vigorous agitation. The product, bis(1-methyl cyclopentadienyl)nickel, remains dissolved in the toluene. The toluene layer is then separated from the aqueous layer and the toluene removed by aqueous distillation. The product is then recrystallized from 600 parts of hot ethanol to produce an almost quantitative yield of bis(1-methyl cyclopentadienyl)nickel.

Equally good results are obtained when other cyclomatic derivatives of alkali metals such as 1-methyl cyclopentadienyl sodium, 2-isopropyl cyclopentadienyl potassium, 1-ethenyl cyclopentadienyl lithium, and the like are reacted with nickel halides such as nickel bromide, nickel chloride and nickel iodide.

*Example V*

*Dicyclopentadienyl ruthenium.*—Cyclopentadienyl lithium is prepared as described in Example II. Thirty-eight parts of the cyclopentadienyl lithium are slowly added with agitation to 20.7 parts of ruthenium chloride in anhydrous ether in a reaction vessel of the kind described in Example III. A vigorous reaction occurs. On completion of the addition of the cyclopentadienyl lithium, 500 parts of a saturated solution of an aqueous ammonium chloride are added to the reaction mixture accompanied by vigorous agitation. The product is isolated from this mixture by extraction with 400 parts of benzene which is added to the mixture with thorough agitation. The ether-benzene layer is then separated from the aqueous layer and the ether and benzene removed by vacuum distillation. The residue is recrystallized from 500 parts of hot ethanol to produce an almost quantitative yield of dicyclopentadienyl ruthenium.

The process of this invention as illustrated in the above examples can be employed to make other metallic cyclopentadienyl moiety-containing compounds of the Group VIII elements which contain the cyclopentadienyl group or configuration in the hydrocarbon parts of the molecule. Non-limiting examples of such products are: dicyclopentadienyl osmium which is obtained by the reaction of a cyclopentadienyl alkali metal compound such as cyclopentadienyl sodium with an anhydrous osmium halide such as, for example, osmium chloride; dicyclopentadienyl cobalt halide such as, for example, dicyclopentadienyl cobalt bromide obtained by the reaction of a cyclopentadienyl alkali metal compound with an anhydrous cobalt halide such as cobaltic bromide; bis(2-amyl cyclopentadienyl)rhenium halide such as bis(2-amyl cyclopentadienyl)rhenium iodide obtained by the reaction of 2-amyl cyclopentadienyl alkali metal compound such as 2-amyl cyclopentadienyl potassium with an anhydrous rhenium halide such as rhenium iodide; bis(2-phenyl cyclopentadienyl)iridium fluoride obtained by the reaction of 2-phenyl cyclopentadienyl lithium with iridium fluoride; bis(2,3-dimethyl cyclopentadienyl)palladium obtained by the reaction of 2,3-dimethyl cyclopentadienyl alkali metal compound such as 2,3-dimethyl cyclopentadienyl sodium with a palladium halide such as palladium chloride; bis(3-tert-butyl cyclopentadienyl) platinum obtained by the reaction of 3-tert-butyl cyclopentadienyl potassium with a platinum halide such as platinum bromide; bis(1-methyl cyclopentadienyl)iron which can be obtained by the reaction of 1-methyl cyclopentadienyl alkali metal compound such as methyl cyclopentadienyl sodium with a ferric halide such as ferric bromide; bis(1-ethyl cyclopentadienyl)nickel which can be obtained by the reaction of 1-ethyl cyclopentadienyl lithium with an anhydrous nickel chloride; difluorenyl ruthenium which can be obtained by the reaction of fluorenyl sodium with anhydrous ruthenium chloride; and the like.

Examples of still other products that can be obtained by the process of our invention include the following: di(cyclopentadienyl)osmium, di-(4-n-nonyl - cyclopentadienyl)osmium, di-(2-ethenyl-cyclopentadienyl)osmium, (2 - ethyl - cyclopentadienyl) - (3 - n - propyl - cyclopentadienyl)osmium, di(cyclopentadienyl)ruthenium, di - (3-n - decyl - cyclopentadienyl)ruthenium, di - (4 - (Δ²-pentenyl) - cyclopentadienyl)ruthenium, (3 - methyl-cyclopentadienyl) - (4 - methylcyclopentadienyl)ruthenium, di(cyclopentadienyl)iron, di - (4 - ethyl - cyclopentadienyl)iron, (3 - methyl cyclopentadienyl) - (4 - ethyl-cyclopentadienyl)iron, di - (4 - phenyl-cyclopentadienyl)- osmium, (2 - ethyl - cyclopentadienyl) - (3 - phenyl - cyclopentadienyl)ruthenium, di - (4 - phenyl - cyclopentadienyl)iron, di - (3,4,5,6 - tetrahydroindenyl)iron; di-(1,2,3,4,5,6,7,8 - octahydrofluorenyl)osmium; di - (3,4,5, 6-tetrahydroindenyl)ruthenium, di(indenyl)osmium, di(fluorenyl)osmium, di(indenyl)ruthenium, di(fluorenyl)-ruthenium, and the like.

The process of this invention can be carried out at atmospheric pressure although much lower and also much higher pressures can also be used. The temperature at which this process can be conducted varies from about −100° C. to about 300° C., although both lower and higher temperatures can be employed. The upper and lower limits are restricted by the solvent in which the reaction is carried out, if a solvent is used. Where no solvent is used the upper temperature limit is dependent upon the temperature at which decompositions or polymerization of one or more of the components, such as of the cyclopentadienyl type alkali metal compound reagents, or of the products occurs. In general, we prefer to conduct our process in the temperature range of from about −20° C. to about 100° C. When using diethyl ether as a solvent we especially prefer to conduct the reaction in the temperature range of from about −10° C. to about 34° C.

As indicated hereinabove, the cyclopentadienyl type compounds, from which the cyclopentadienyl alkali metal compounds employed in this process are obtained, contain the characteristic cyclopentadienyl moiety or group. Examples of such compounds are 1-methyl cyclopentadiene, 2,3-dimethyl cyclopentadiene, 2-isopropyl cyclopentadiene, 2-tert-butyl cyclopentadiene, 2-amyl cyclopentadiene, 2-eicosyl cyclopentadiene, 1-ethenyl cyclopentadiene, 2(2-propenyl)cyclopentadiene, 2(2-butenyl) cyclopentadiene, 2(2-phenylethyl)cyclopentadiene, 2(2-phenyl-1-propenyl)cyclopentadiene, 2 - cyclohexyl cyclopentadiene, dicyclopentadiene, 2,5-dimethyl dicyclopentadiene, 2-phenyl cyclopentadiene, 2-naphthyl cyclopentadiene, 2-o-tolyl cyclopentadiene, indene, fluorene, 1-methyl indene, 2-methyl indene, 3-ethyl indene, 2,3-dipropyl indene, 3,4,5,6-tetrahydroindene, 3,6-dimethyl indene, 1,2,3,4,5,6,7,8-octahydrofluorene, 9-methyl fluorene, 3,6-diethyl fluorene, and the like. Illustrative examples of cyclopentadienyl moiety-containing compounds of Group VIII elements which can be obtained by reacting alkali metal derivatives of the above compounds with the halides of the Group VIII elements have been given hereinabove.

In carrying out the process of this invention the reagents can be reacted without the presence of any solvent or diluent. However, it is preferred to use a solvent in order to facilitate contact between the reagents and to moderate the reaction rate. The solvent chosen should be one which does not react with either the cyclopentadienyl-type alkali metal compounds or the halides of the Group VIII elements. One class of compounds found to be suitable as a solvent is the ethers, non-limiting examples of which are methylethyl ether, diethyl ether, dibutyl ether, allylethyl ether, amylethyl ether, anisole, benzylethyl ether, phenylethyl ether, butyl-o-tolyl ether, dioxane, and also various mixtures of different ethers. Polyethers, such as dimethylether and diethyl ether of diethyleneglycol may also be used as solvents. Another class of substances is the aromatic and substituted aromatic compounds such as benzene, naphthalene, anthracene, toluene, ethyl-benzene, the xylenes and various other hydrocarbon substituted benzenes, anthracenes and the like. Still another class of compounds useful as solvents is tertiary amines, and in particular, aliphatic tertiary amines having boiling point between 75° and 160° C., such as triethylamine, tripropylamine, and the like. Mixtures of the above solvents can also be employed. In addition to the above, mixtures of aliphatic hydrocarbons such as pentanes, hexanes, cyclohexanes, octanes, and the like can be employed in conjunction with an ether and/or an aromatic hydrocarbon or with a mixture of the latter two in making up a suitable solvent in which to conduct the reaction of this process. A guide in the selection of a solvent will be the consideration of such factors as the temperature at which the reaction is desired to be conducted, the solubility of one or both of the reactants in that solvent as well as the solubility of the product which is formed, and the like.

Another embodiment of this invention is a process for the preparation of dicyclopentadienyl iron comprising the steps of (a) reducing ferric chloride to ferrous chloride by reacting said ferric chloride with iron powder in a polyether solvent and at a temperature in the range of from about 100° to about 150° C.,
(b) reacting a cyclopentadienyl alkali metal compound with said ferrous chloride in said polyether solvent and at a temperature of at least 35° C., and
(c) isolating said dicyclopentadienyl iron.

A main advantage of the above process is the improvement in economics of the preparation of dicyclopentadienyl iron since, in that process, relatively inexpensive iron powder rather than a cyclopentadienyl alkali metal is employed to reduce ferric chloride to ferrous chloride. An important aspect of this process is that it should be carried out in a solvent, preferably a polyether such as the diethyleneglycol dimethylether, diethyleneglycol diethylether, and the like. The first step of the process should be carried out at a temperature of from about 100° to about 150° C. and ferric chloride should be added to the slurry of iron powder and the solvent. The order of addition is important because if ferric chloride were added to the ether solvent, the two materials would react yielding undesirable products. Furthermore, the second step of the process, that is the reaction of cyclopentadienyl alkali metal with ferrous chloride (the slurry resulting from the first step) should be carried out as soon as possible being careful not to permit the temperature of said slurry to fall below room temperature and, preferably maintaining it at above 35° C. If the slurry cools to room temperature, ferrous chloride forms a complex with the ether solvent and, thus, it would be necessary to use a large excess of a solvent to complete the reaction.

The following example illustrates the process described above as well as the procedure for isolating the final product. All parts are by weight unless otherwise indicated.

*Example VI*

To a first reaction vessel capable of withstanding pressures up to 350 p.s.i.g. and equipped with stirrer, temperature measuring means, condensing means, and venting means was charged 1230 parts of the dimethylether of diethyleneglycol and 151 parts of sodium. The pressure vessel was then sealed and flushed with nitrogen. The vessel contents were then heated to 110° C. causing the sodium to melt. The stirrer was started and the temperature raised to about 185° C., at which temperature a total of 516 parts of cyclopentadiene dimer was added over a period of two hours. During the addition of cyclopentadiene dimer, the hydrogen produced in the reaction was continually vented so as to maintain the reaction pressure such that the reflux temperature of the reaction mass was in the range of from 185 to 190° C. Following this, the pressure vessel contents were maintained at 185–190° C. for an additional hour after which they were cooled to 140° C.

In a second reaction vessel was placed 1230 parts of the dimethylether of diethyleneglycol and 67 parts of hydrogen-reduced iron powder. This reaction vessel was then flushed with nitrogen and the contents heated to 125° C. During the following four-hour period, a total of 356 parts of ferric chloride was added to the reaction vessel in about 10-part increments while maintaining the reaction temperature between 110–140° C. Following the addition of the ferric chloride, the reaction contents were cooled to about 100° C.

The contents of the first reaction vessel were then transferred to the second reaction vessel over a two-hour period while maintaining the temperature of the second reaction vessel at about 100 to 125° C. The contents of the second reaction vessel were then cooled to about 50° C. and water added in quantities sufficient to cause the dicyclopentadienyl iron to come out of solution. Following this, the reaction mixture in the second reaction vessel was filtered and the precipitate extracted with toluene until all toluene-soluble material had been removed. The toluene extract was then placed in a vessel equipped with an agitator, temperature measuring means, and distillation means. Heat was applied causing the toluene to distill off until the liquid temperature reached about 125° C. At this point, heat was discontinued and the liquid remaining in the vessel was cooled to about 10° C. causing dicyclopentadienyl iron to precipitate as orange crystals. The dicyclopentadienyl iron was recovered by filtration and was obtained in quantities equivalent to about 80% yield. The dicyclopentadienyl iron was identified by its melting point of 173–174° C.

In the commercial production of the compounds of our invention it is particularly attractive to conduct the process in a continuous manner. This can be done by a variety of techniques such as passing the reactants either substantially pure or admixed with an inert carrier or solvent through a reaction zone. The product stream can be treated as described hereinabove in order to separate the products and unreacted materials. The continuous method for conducting the process of this invention can be carried out either in a "once through" manner or with recycling of reactants and products. In continuous and batch modifications of our invention, the reactants can be diluted with inert gases or liquids such as propane, ethane, nitrogen, helium, hexane, octane, an ether, an aromatic hydrocarbon, various mixtures of the above, and the like.

The compounds that can be made by the process of this invention have a variety of uses. For example, they can be employed as fuel additives to improve the antiknock quality as well as other characteristics of fuels for internal combustion engines. Other uses includes those of heat transfer agents, chlorination catalysts, intermediates for the synthesis of chemicals possessing therapeutic value, and as dielectric materials in various electrical instruments.

Furthermore, cyclopentadienyl moiety-containing compounds of Group VIII metals can be successfully employed as antiknock additives to diverse commercially available fuels having widely differing chemical compositions with respect to hydrocarbon type and sulfur content. Thus, for example, we can employ di-indenyl iron in the following typical gasoline comprising the following component percentages: straight run, 51.4; catalytically cracked, 22.8; thermally cracked, 14.3; isopentane, 8.6; butane, 2.9; having a sulfur content of 0.162 percent; and having a clear Research Octane Number of 81.2, in amounts between about 0.03 and 8.0 grams of iron per gallon to provide a fuel of superior antiknock quality.

Having fully described the novel compounds of this invention and the process for their preparation, it is desired that this invention be limited only within the lawful scope of the appended claims.

We claim:
1. A process for the manufacture of Group VIII metallic cyclopentadienyl moiety-containing compounds comprising reacting a cyclopentadienyl alkali metal compound with a halide salt of a metal of Group VIII.
2. A process for the manufacture of Group VIII metallic cyclopentadienyl moiety-containing compounds comprising reacting a cyclopentadienyl alkali metal compound with an anhydrous halide salt of a metal of Group VIII.

3. The process of preparing dicyclopentadienyliron which comprises reacting an anhydrous iron halide with cyclopentadienyl lithium.

4. The process of preparing dicyclopentadienyliron which comprises reacting anhydrous ferric chloride with cyclopentadienyl lithium.

5. The process for preparing dicyclopentadienyliron which comprises reacting anhydrous ferric chloride with an alkali metal compound of cyclopentadiene.

References Cited by the Examiner

UNITED STATES PATENTS 2,834,796  5/1958  Barush et al. _____ 260—429
3,092,647  6/1963  Hobbs _____ 260—439

HELEN M. McCARTHY, *Acting Primary Examiner.*

TOBIAS E. LEVOW, *Examiner.*

T. L. IAPALUCCI, A. P. DEMERS, *Assistant Examiners.*